Feb. 4, 1969 A. MASUCCI 3,425,773
ADJUSTABLE BI-FOCAL SPECTACLES
Filed June 30, 1964

INVENTOR.
ALBINO MASUCCI

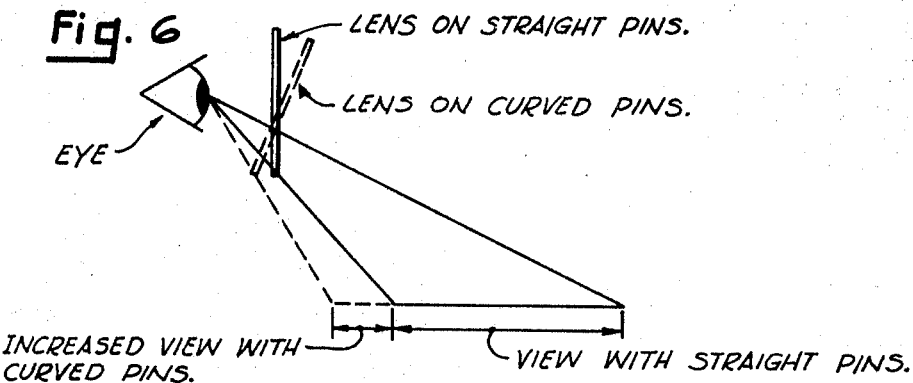
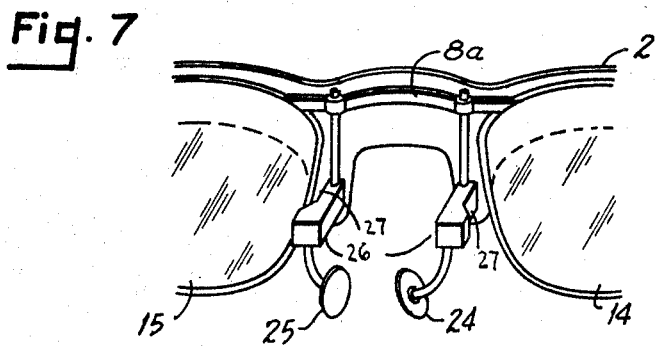
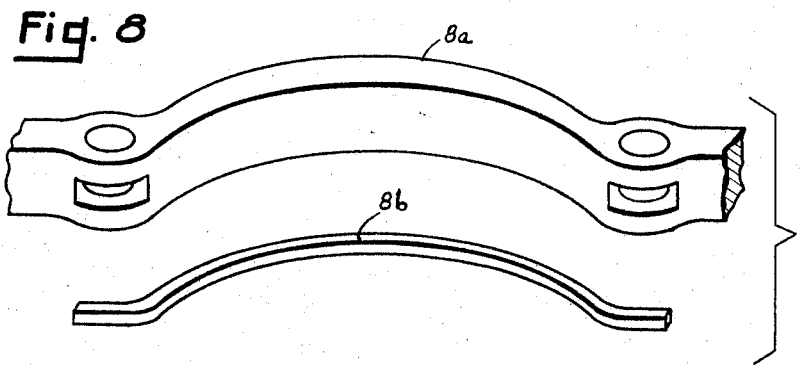

3,425,773
ADJUSTABLE BI-FOCAL SPECTACLES
Albino Masucci, 1230 Leland Ave.,
Bronx, N.Y. 10472
Filed June 30, 1964, Ser. No. 379,291
U.S. Cl. 351—55                                    1 Claim
Int. Cl. G02c 7/06

ABSTRACT OF THE DISCLOSURE

Adjustable bi-focal spectacles which include a single frame having trolley-pins attached thereto to receive a lens carrying chassis so that the chassis and frame are movable with respect to each other. The frame further has recessed portions to permit a portion of the lens to recede therein to permit adjustment of the field of view according to bi-focal adjustment.

---

This invention relates generally to bi-focal spectacles and is particularly directed to adjustable bi-focal spectacles wherein the field of view may be alterable at will by the wearer without changing or altering the position of the spectacles' frame.

There has been a steady trend in the opthalmic profession to style many eye-glass frames with a short vertical dimension. At the present time a patient has a choice of selecting a frame which has a narrow shape (small vertically) or a deep shape (larger vertically). Where the frames are narrow in the vertical, the field of view for bi-focals is very restricted so that the tendency would be to use the deeper frame which perhaps is not so stylish or in vogue.

To some degree there have been some attempts to overcome the rigidity of frames in the vertical, especially in bi-focals, but all such attempts have been unsatisfactory either as to operation or as to appearance, the esthetic effect having been lost by the cumbersome mechanism and device used to achieved the vertical adjustable feature effect.

In the instant case applicant provides a single frame with an adjustable carriage carrying the lenses, the carriage then being mounted to the frame in such a manner that it is movable relative thereto so that the lens vertical dimension can be easily and conveniently adjusted to accommodate different fields of view and to present the viewer with different lenses as in the case of bi-focal arrangements.

It is therefore a principal object of the invention to provide improved bi-focal spectacles.

Another object of the invention is to provide spectacles having a frame and an adjustable lens carriage relative to the said frame.

A further object of the invention is to provide bi-focal spectacles having a frame and lens carriage which can be adjusted to provide a variable field of view without altering or removing the frame and/or spectacles.

A still further object of the invention is to provide spectacles having dual function lenses which can be adjusted in accordance with the function desired without changing the spectacles or frames forming a part thereof.

Another object of the invention is to provide adjustable bi-focal spectacles which are simple, rugged, economical to use, and provide the esthetic effect inherent in narrow (vertical) shape spectacles.

Other objects and advantages will become apparent from a reading of the specifications and a study of the accompanying drawings and wherein;

FIGURE 6 shows diagrammatically the variations in viewing area for changes and lens position.

FIGURE 7 shows a perspective drawing of the lens holding assembly and particularly the notched-out portions of the pin base.

FIGURE 8 shows the tensioned bridge element of the lens carriage.

Figure 1:
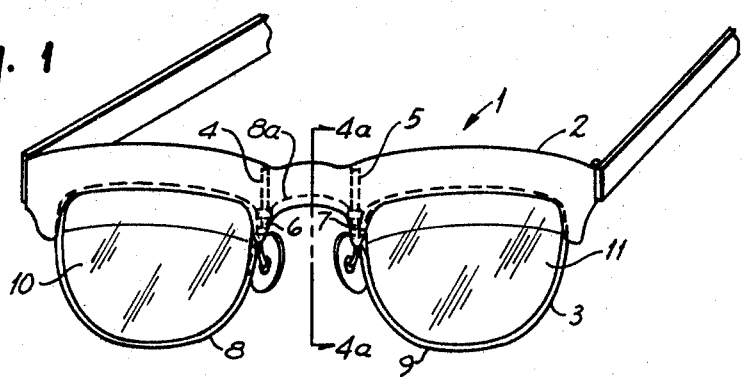
FIGURE 1 shows a pair of spectacles having adjustable bi-focal lenses and wherein the lens as shown are adjusted for maximum vertical dimension and field of view for distance vision according to the invention.
Figure 2:
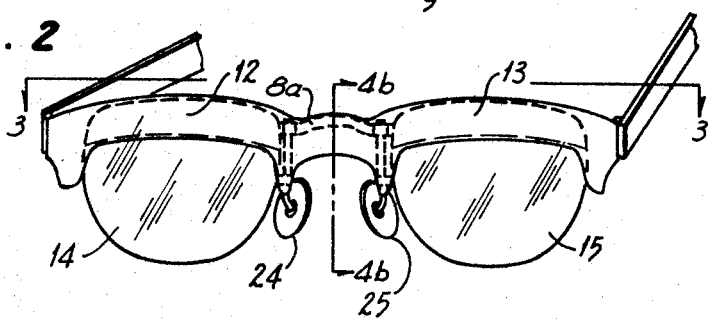
FIGURE 2 is similar to FIGURE 1 but that the lenses are adjusted for minimum vertical dimension or maximum reading area.

Now proceeding to describe the invention, there is shown in FIGURES 1 and 2 a pair of spectacles 1 having a frame 2 and chassis or carriage 3 in proximity to each other and each free to move relative to one another in a generally vertical direction. The movement is accomplished by an arrangement consisting of a pair of spaced apart trolley pins 4 and 5 attached to the central viewing side of the frame, the said pins being disposed to receive in slidable engagement a pair of bushings or eyelets 6 and 7 attached to the inner lens carriage and spaced apart in a manner similar to the pins. The carriage is further provided with a tensioned bridge element 8a holding the lens retaining rims 8 and 9 and providing a tensile retaining stress between the said eyelets 6 and 7 so as to provide certain frictional forces to the eyelets when they are in slidable engagement with the trolley pins they traverse in accordance with the invention herein.

When the frame and chassis are in cooperative engagement via the movements of the pins and eyelets forming a respective part thereof, the lens 10 and 11 mounted to the carriage rims can recede into the opaque frame area 12 and 13 as shown in FIGURE 2. This area may or may not be grooved or recessed to form an enclosure, the structure thereof not being decisive. However, the area itself must be one which blocks out the view of this portion of the recessed lens so as to permit the viewer to view only the lower, exposed portion of the lens 14 and 15. Thus from FIGURES 1 and 2 it appears that the user may with a single frame provide himself with spectacles having viewing lenses that appear either narrow or deep and in the case of bi-focals with maximum reading area or maximum distance area. For example, the deeper lens area in FIGURE 1 provides the used with maximum distance area. In FIGURE 2 the narrow lens area provides the user with the maximum reading area.

Figure 3:
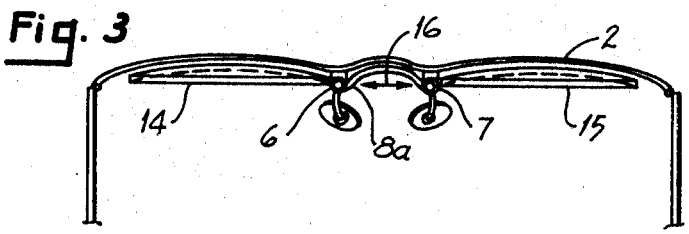
FIGURE 3 is a top view of the spectacles as shown in FIGURE 1 through the line 3—3.

In FIGURE 3 there is shown a top sectional view through the line 3—3 of FIGURE 2 and shows the special relationship between lens 14 and 15 and the frame 2. There is further shown the tensioned bridge element 8a holding apart the eyelets 6 and 7 under the forces as indicated by the arrow 16. This type of stress provides certain bearing forces between the pin and eyelets when they are slidably engaged. Hence, the elevation or lowering of the carriage relative to the frame may be made at will and the position of rest can be selected at any point not heretofore possible in other spectacles or frames. The desired adjustment may be made by the flick of a finger or movement of the hand without making any lens or frame change, without removing the spectacles from the wearer and without making any other kind of burdensome and time-consuming adjustments or manipulations.

Figure 4A:
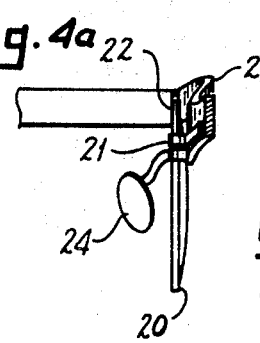
FIGURE 4a is a section through the line 4a—4a of FIGURE 1.
Figure 4B:
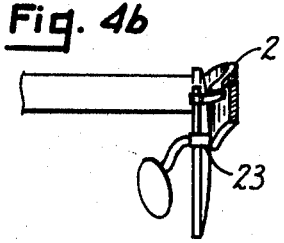
FIGURE 4b is a section through the line 4b—4b of FIGURE 2.

FIGURES 4a and 4b show detailed partial sectional views of FIGURES 1 and 2 and show in particular the details of the trolley spaced apart pins and the bushings or eyelets which traverse the pins in making the chassis or carriage movements relative to the frame. FIGURE 4a shows the lens 20 in the lowest or deepest position. The eyelet 21, attached to chassis or carriage 3, as shown in FIGURE 1 resides at the lowest point of the pin 22. The pin is rigidly adhered to the pin base 23 and the combination structurally connected to and integrated with the frame 2. In FIGURE 4b the lens is at its narrow point with the eyelet residing near the uppermost and near-extreme end of the trolley pin. Also connected to the frame and forming an integrated part thereof are the nose-rest pieces or members 24 and 25, the lens carriage being displaced relative to said nose pieces so as to obviously do away with the movement of the frame and the said corresponding nose pieces.

Figure 5:
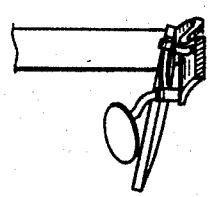
FIGURE 5 shows partially sectioned a view through frame of FIGURE 1 particularly showing the trolley pin according to another embodiment of the invention.

Another configuration of the trolley pins and therefore another embodiment of the invention is shown in FIGURE 5 and wherein the said pins have a curved pattern where the radius of curvature reisdes in front of the lens or viewer so that by the movement of said lens the viewer will be permitted to have a greater depth of field or vision with no area of the lens lost to the viewer and no loss of focus. This is clearly illustrated in FIGURE 6, which shows how the view is increased by the use of said curved pins versus the straight pins.

FIGURE 7 shows a detailed view of the pin structure and the supporting base therefore. In particular the supporting base 26 has a notched portion 27 which permits the lens element to freely traverse, in a vertical direction, the frame structure thereby preventing any restriction in the displacement of the lens carriage in its movements.

FIGURE 8 shows a bridge element 8a, as previously described, adapted to receive in any convenient and suitable fashion a spring-like element 8b which provides the resiliency to the bridge previously referred to.

The invention as described and shown may be modified or changed in certain aspects and design without detracting from the true purpose and intent of the invention. For example, the lens as shown may be those designed and used for sun-glasses wherein the lower lens area may be tinted and the upper lens area clear so that whenever an occasion arises, such as in entering a tunnel where no time is available for a lens or glass change, a mere flick of the finger permits the user to adjust his spectacles for the immediate use necessary.

Having described the invention what is claimed is:
1. Adjustable bi-focal spectacles comprising,
  (a) a support frame including a bridge portion and a pair of wide opaque arms extending outwardly from the ends of the bridge portion and carrying temples at their outer ends, said arms having vertical recessed portions spaced from their front surfaces,
  (b) a pair of spaced parallel trolley pins extending upwardly from nose rest carrying base portions disposed rearwardly at the ends of said bridge portion, said trolley pins being curved about a radius center located forwardly of said support frame, and
  (c) a lens carrying chassis including a spring tensioned bridge carrying spaced apart eyelets at its outer ends, said eyelets slidably and frictionally engaging the respective trolley pins to enable vertical adjustment of said lens carrying chassis from a lower position wherein substantially the entire extent of the lens is exposed for viewing to an upper position wherein the upper portions of the lenses are concealed in the recessed portions of the support frame arms and the lower portions of the lenses are angled toward the wearer's eyes.

References Cited
UNITED STATES PATENTS

| | | | |
|---|---|---|---|
| 2,104,063 | 1/1938 | Whitney | 351—55 |
| 2,393,959 | 2/1946 | Blumenthal | 351—57 |
| 2,446,725 | 8/1948 | Seguin | 351—55 |
| 2,687,671 | 8/1954 | Mosher | 351—47 |
| 2,842,029 | 7/1958 | Roth | 351—57 |
| 3,045,544 | 7/1962 | Schmidt | 351—57 |

DAVID H. RUBIN, *Primary Examiner.*

U.S. Cl. X.R.

351—45, 47